Patented June 12, 1928.

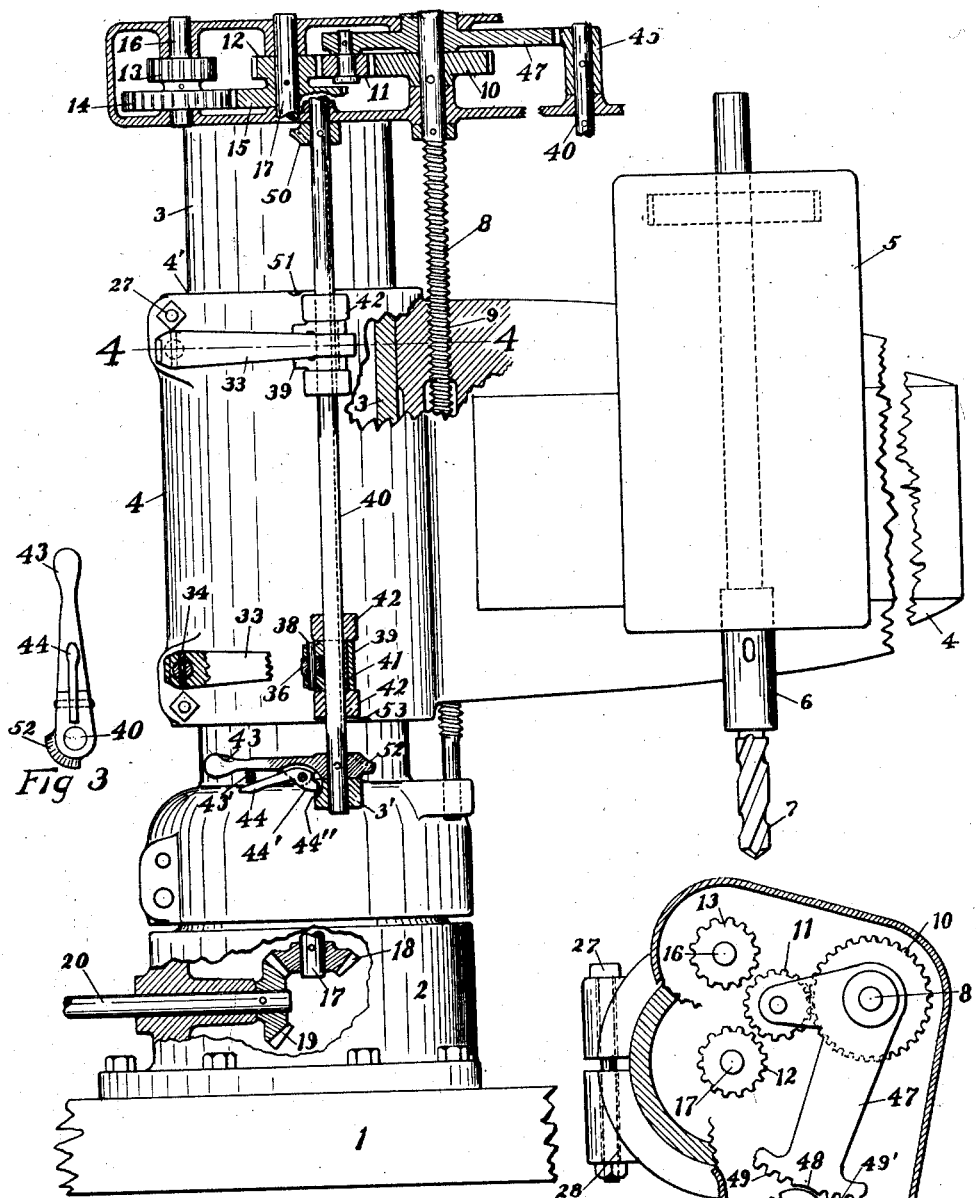

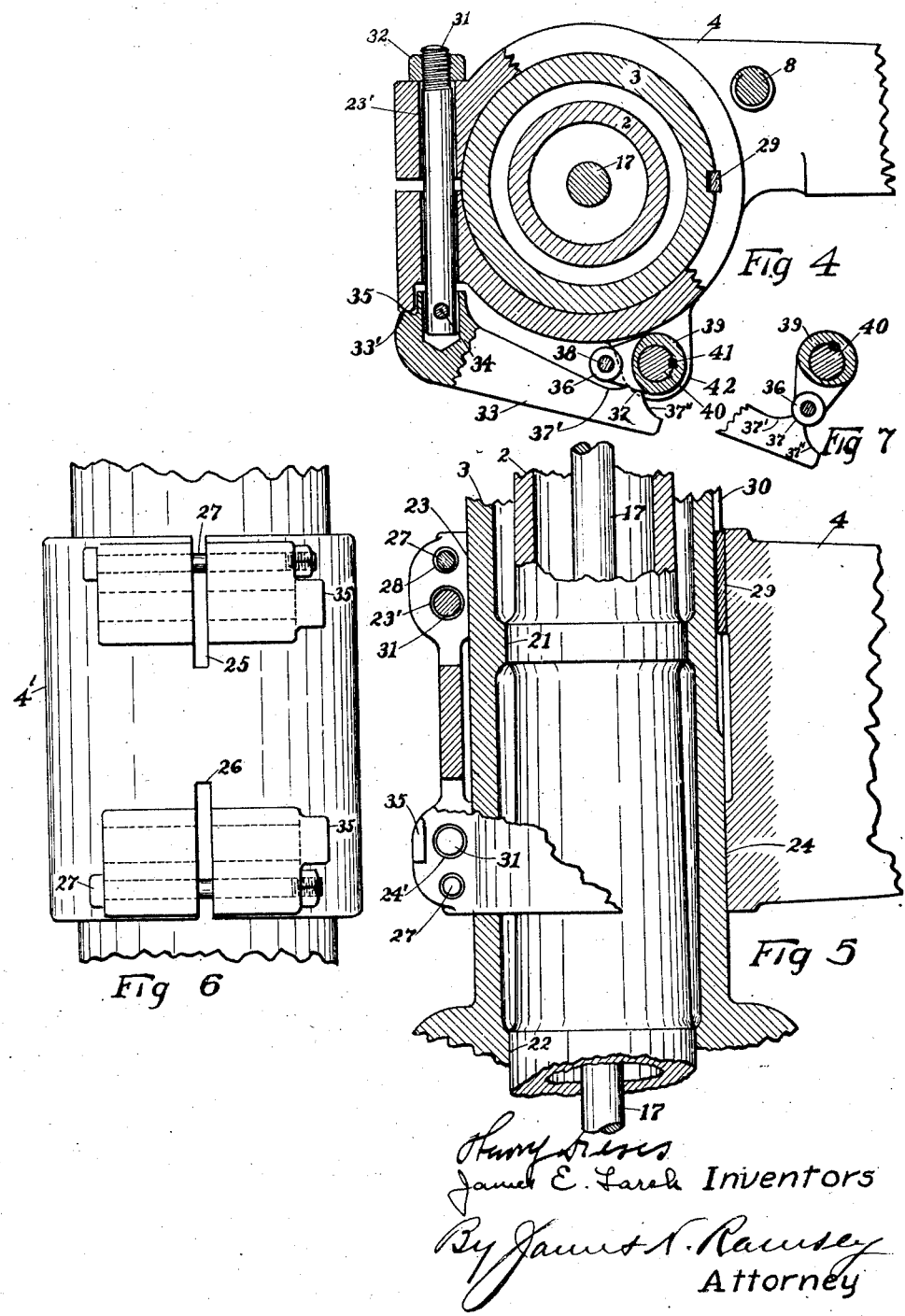

1,672,932

UNITED STATES PATENT OFFICE.

HENRY DRESES, OF CINCINNATI, AND JAMES E. LARSH, OF CHEVIOT, OHIO, ASSIGNORS TO THE DRESES MACHINE TOOL CO., OF CINCINNATI, OHIO, A CORPORATION OF OHIO.

RADIAL DRILL.

Application filed February 21, 1924. Serial No. 694,389.

Our invention relates to radial drills and more particularly to mechanism for locking and adjusting the radial drill arm.

The objects of our invention are to provide a manual operative lever adapted to automatically unclamp a radial drill arm from the vertical column of a radial drilling machine prior to the engagement of the mechanism adapted to elevate and lower said arm relative to said column and adapted to automatically clamp said radial drill arm on said vertical column after disengagement of said mechanism adapted to elevate and lower said arm relative to said column; to provide means adapted to enable a radial drill operator to unclamp said arm from said column and elevate and lower said arm on said column by manual actuation of a single lever; to provide means adapted to enable said radial drill operator to disengage mechanism adapted to elevate and lower said arm on said column and clamp said arm on said column by manual actuation of said single lever; and to provide a convenient position for said lever whereby said operator may actuate the same when in a position usually assumed when operating a radial drill.

Our invention consists in providing in combination with usual power gears a tumbler having a gear at one end thereof in continuous mesh with a pinion, said gear combinedly fixed to the screw shaft and said tumbler; in providing a concave surface intermediate teeth at the other end of said tumbler, said concave surface adapted to engage a convex surface of an intermittent segment gear whereby said tumbler is retained in a neutral position relative to said power gears, said intermittent segment gear having teeth adjacent each end of said convex surface and means adapted to engage said teeth of said tumbler with said teeth of said intermittent segment gear for engaging said pinion with said power gears for elevating and lowerng a usual radial drill arm on a usual radial drill column, said means comprising a manually or power operative rocker lever fixed to a rocker shaft having said intermittent segment gear fixed thereto; in providing means adapted to automatically unclamp said radial arm from said column prior to engagement of said pinion with either of said power gears, said means comprising a roller fixed to a rocker arm keyed to said rocker shaft, said roller adapted to engage a cammed end of a clamping lever having its other end pivotally connected to a draw bolt received through a slotted bearing of said arm, said slotted bearing received around said column whereby actuation of said rocker lever causes said roller to disengage said cammed end of said clamping lever thereby permitting said slotted bearing of said radial arm to expand around said column; in providing a shoulder integral with the end of said clamping lever which is pivoted to said draw-bar whereby actuation of said rocker lever causes said roller to engage said cammed end after disengaging said pinion from said power gears, simultaneously engaging said shoulder with a lug integral with said slotted bearing whereby said drawbar clamps said radial arm bearing around said column; in providing a finger contact and releasable latch pivotally connected to said rocker lever, said latch having a pawl integral therewith and adapted to engage a groove in said column whereby said pinion is adapted to be retained in a neutral position relative to said power gears and said roller is adapted to be retained in engagement with said cammed end thereby retaining said slotted bearing in a clamped position around said column.

Our invention also consists in the combination and arrangement of parts and in the details of constructon as herein set forth and claimed.

In the drawings:

Fig. 1 is a side elevation of a radial drill with parts broken away and partly shown in section showing our invention embodied therein;

Fig. 2 is a plan view of our gearing and mechanism for elevating and lowering a radial drill arm;

Fig. 3 is a bottom view of our rocker lever for elevating and lowering and respectively clamping and unclamping a radial drill arm;

Fig. 4 is a section taken on a line corresponding to 4—4 of Fig. 1;

Fig. 5 is a part section and part elevation showing a portion of our invention as embodied in a radial drill arm clamped around a radial drill column;

Fig. 6 is a side elevation showing the slotted end bearing of a radial drill arm on a radial drill column; and Fig. 7 is a part elevation and part section showing the position of our rocker arm when in clamped relation corresponding to the position of the gearing as shown in Fig. 2.

A usual radial drilling machine may comprise base 1, inner column 2, outer column 3, radial drill arm 4 having slotted bearing 4' rotatable on column 3, and drill head 5 slidable longitudinally of arm 4 and having drill spindle 6 for receiving tool 7.

Radial drill arm 4 is adjustable vertically on column 3 by means of screw shaft 8 threaded to arm 4 at 9. Suitable means are provided for rotating screw shaft 8 in desired directions as herein exemplified by gear 10 fixed to the upper end of the shaft, tumbler gear 11 adapted to mesh with either power gears 12 and 13 rotatable in opposite directions and driven in a usual manner through meshing gears 14 and 15 positioned at the top of column 3 and respectively fixed to power gears 13 and 12. Vertical shaft 17 has gear 15 fixed to the top thereof and meshing with gear 14 and has beveled gear 18 fixed to the lower end thereof and meshing with bevel gear 19 fixed to horizontal shaft 20 connected with suitable outside power.

Outer column 3 is rotatably carried on bearings 21 and 22 of inner column 2 and means for clamping the column either by hand or power in a desired position may comprise a modified form of our invention as hereinafter described.

For vertical adjustment of radial drill arm 4 one or more contact bearings 23 and 24 respectively have slots 25 and 26 adapted to cooperate with clamping means. Tension bolts 27 threaded through holes 28 in arm 4 are adapted to secure slotted bearings 23 and 24 in snug contact with column 3 and adjust the bearing when a loose fit is caused by wearing away of the surface of the metal after considerable use.

Radial drill arm 4 has usual integral key 29 slidable in vertical keyway 30 in column 3 for maintaining the proper radial alinement of the radial drill arm relative to column 3.

The mechanism as explained up to this point represents usual mechanism of a radial drill.

In the preferred construction of our invention as illustrated in combination with a radial drill we provide draw bolts 31 respectively received in holes 23' and 24' in bearings 23 and 24 of radial drill arm 4 and respectively extending through slots 25 and 26. Draw bolts 31 each have adjustable nut 32 threaded to one end thereof and at each of their other ends is clamp lever 33 pivotally connected thereto by pivot 34. Each clamp lever 33 has shoulder 33' at one end thereof in fulcrum contact respectively with lugs 35 respectively integral with bearings 23 and 24. The clamp levers are respectively actuated by rollers 36 respectively rotatably mounted on stud shafts 38 respectively fixed in the ends of rocker arms 39 respectively slidably keyed to vertical rocker shaft 40 by keys 41 respectively mounted in lugs 42 integral with radial arm 4. Rollers 36 are adapted to facilitate the contact of shoulders 33' with lugs 35 through engagement with arced surface 37. Arced surface 37 is intermediate arc surfaces 37' and 37'' and elevated therefrom thereby affording greater pressure of shoulders 33' respectively with lugs 35 whereby when rollers 36 respectively engage arced surfaces 37 bearings 23 and 24 are tightly clamped around column 3.

Manually operated rocker lever 43 fixed to the lower end of rocker shaft 40 provides convenient actuating means therefor. Finger contact latch 44 pivotally connected to rocker lever 43 and urged in operative position by spring 43' combinedly fixed to the rocker lever and the latch serves to lock rocker shaft 40 in neutral position with roller 36 in engagement with arced surface 37 as shown in Fig. 7, whereby radial drill arm 4 is locked against vertical movement on column 3 and the operating gears as hereinafter described are disengaged.

Actuation of finger contact latch 44 disengages its integral pawl 44' from a vertical groove at 44'' in boss 3' of column 3 thereby permitting rocker lever 43 to be moved horizontally toward the right or left for elevating and lowering radial drill arm 4 through tumbler gear 11, gears 12, 13 and 10, and screw shaft 8 threaded to radial drill arm 4 at 9.

To illustrate the operation of the mechanism of our invention, assume rocker shaft 40 is in a neutral position as shown in Fig. 7. Movement of rocker lever 43 toward the left causes rollers 36 to respectively disengage arced surfaces 37 of clamping levers 33, as shown in Fig. 4, thereby relieving the tension in draw bolts 31 through disengagement respectively of shoulders 33' of clamping levers 33 with lugs 35 respectively integral with slotted bearings 23 and 24 thereby permitting the bearings to expand and widen slots 25 and 26 whereby radial drill arm 4 is unclamped from column 3. Fixed to the upper end of rocker shaft 40 is an intermittent segment pinion 45 having a concentrically curved surface 46 on its outer periphery and intermediate teeth 45' and 45'' integral with the segment pinon meshing with segment tumbler 47 rotatably mounted on screw shaft 8 and having concave surface 48 adapted to fit convex curved surface 46 of pinion 45, thus permitting rocker shaft 40 to be rotated toward the left or right sufficiently to clamp and unclamp radial drill arm bearings 23 and 24 around column 3 previous to the engagement of teeth 45′ or 45″ of pinion 45 respectively with teeth 49 and 49′ integral with segment tumbler 47 and adjacent concave surface 48.

Further manual actuation of rocker shaft 40 toward the left causes teeth 45′ of segment pinion 45 to engage teeth 49 of segment tumbler 47 thereby rotating tumbler 47 on screw shaft 8 and engaging pinion 11 with power driven gear 12 which is rotating in an opposite direction to gear 13 thereby rotating screw shaft 8 and through threaded connection 9 lowers radial drill arm 4. Sufficient movement of rocker lever 43 to the right causes teeth 45″ to mesh with teeth 49′ thereby engaging pinion 11 with power driven gear 13 which is rotating in an opposite direction to gear 12, thereby elevating radial drill arm 4.

While the clamping mechanism is being unclamped through actuation of rocker lever 43 intermittent segment pinion 45 fixed to the upper end of rocker shaft 40 is rotating, and the concentrically curved surface 46 of the segment pinion bearing into concave surface 48 of segment tumbler 47 thereby retains segment tumbler 47 in a neutral position. Immediately after clamping levers 33 have released their tension engagement with draw bolts 31 and have permitted slotted bearings 23 and 24 to expand when movement of rocker lever 43 is toward the left teeth 45′ of segment pinion 45 is rotated in mesh with teeth 49 of segment tumbler 47 thereby causing pinion 11 to move from its neutral position as shown in Fig. 2 and into mesh with power driven gear 12 whereby through pinion 11, gear 10, shaft 8 and threaded connection at 9 radial drill arm 4 is lowered.

Cam 52 integral with rocker lever 43 fixed to rocker shaft 40 is adapted to contact radial drill arm 4 at 53, when the arm has reached its lowest point, for causing the rocker shaft to rotate towards the right thereby automatically disengaging gears 11 and 12 whereby pinion 11 assumes a neutral position relative to the power gears and further downward movement of the radial drill arm is prevented.

Our invention not only eliminates the use of the usual two levers for unclamping or clamping the radial drill arm in contact with the radial drill column and disengaging and engaging the mechansm adapted to elevate and lower the radial drill arm on the radial drill column, but by the use of our device all possibility of operating the mechanism for elevating or lowering the radial drill arm previous to unclamping the radial drill arm from the radial drill column is eliminated. It is customary to provide safety means adapted to safeguard the injury to the mechanism through thoughtless operation of the elevating and lowering lever before operation of the clamping and unclamping lever. We eliminate the necessity and expense of equipping a radial drill machine with this usual safety device as our invention acts as a safeguard against accidental damage of the machinery, inasmuch as it is impossible to actuate the elevating and lowering mechanism previous to the operation of the mechanism for unclamping the radial drill arm from around the column.

Another advantage of our invention is that our single manually operative lever is adapted to actuate the elevating and lowering mechanism of the radial drill arm and the clamping and unclamping mechanism is conveniently located and requires but one operation whereby it is not necessary for the radial drill operator to operate two or more differently positioned levers heretofore customary.

We have, therefore, invented a simple, efficient, practical, economical and effective device for automatically unclamping and elevating or lowering the radial drill arm or disengaging the elevating and lowering mechanism and clamping the radial drill arm in an adjusted position relative to the radial drill column.

While we have chosen to exemplify our invention for use in combination with the elevating and lowering mechanism and clamping mechanism of a radial drill arm, we desire to emphasize the fact that our novel mechanism herein set forth is not intended to show modified forms in which it may be embodied. Changes or modifications in our mechanism may be resorted to without sacrificing any of the advantages of the device as defined in the claims.

What we claim as new and desire to secure by Letters Patent is:

1. In a radial drill having a base, a vertical column having a groove therein, a radial arm having an expanding bearing around said column, a lug integral with said bearing, power gears, a screw shaft having threaded connection with said arm, a rocker shaft, a segment gear fixed to the upper end thereof and having a convex side and having teeth integral therewith, a tumbler arm having a concave surface at one end thereof adapted to engage said convex surface and having teeth adjacent said convex surface adapted to mesh with said segment gear teeth, a screw shaft gear rotatably mounted in the other end of said tumbler arm and fixed to said screw shaft, a pinion rotatably mounted on said tumbler arm and in mesh with said screw shaft gear, a draw bolt received by said expanding bearing, a clamping lever pivoted to said draw bar and having a shoulder adapted to engage said lug and having a convex offset, a rocker arm fixed to said rocker shaft and having a roller adapted to engage said convex offset, a rocker lever fixed to the lower end of said rocker shaft, and a latch pivoted to said lever and having a pawl adapted to engage said groove whereby said convex surface is adapted to be maintained in engagement with said concave surface and said pinion is maintained in a neutral position relative to said power gears.

2. In a radial drill having a base, a vertical column, a radial arm having an expanding bearing around said column, a screw shaft having threaded connection with said arm, a rocker shaft, a segment gear fixed to the upper end thereof and having a convex side and having teeth integral therewith, a tumbler arm having a concave surface at one end thereof adapted to engage said convex surface and having teeth adjacent said convex surface adapted to mesh with said segment gear teeth, a screw shaft gear rotatably mounted in the other end of said tumbler arm and fixed to said screw shaft, a pinion rotatably mounted on said tumbler arm and in mesh with said screw shaft gear, a draw bolt received by said expanding bearing, a clamping lever pivoted to said draw bar and adapted to engage said bearing and having a cammed end, a rocker arm fixed to said rocker shaft and adapted to engage said cammed end, and a rocker lever fixed to the lower end of said rocker shaft.

3. In a radial drill having a base, a vertical column having a groove therein, a radial arm having an expanded bearing around said column, a lug integral with said bearing, power gears, a screw shaft having threaded connection with said arm, a rocker shaft, a segment gear fixed to the upper end of said rocker shaft and having a convex side and having teeth integral therewith and adjacent said convex side, a tumbler arm having a concave surface adapted to engage said convex side and having teeth adjacent said concave surface adapted to mesh with said segment gear teeth, a screw shaft rotatably secured to said tumbler arm and fixed to said screw shaft, a pinion rotatably mounted in said tumbler arm and in mesh with said screw shaft gear, a draw bolt received through said expanding bearing, a clamping lever pivoted to said draw bolt and having a shoulder adapted to engage said lug and means for retaining said shoulder in engagement therewith whereby said expanding bearing is contracted in locked position around said column, a convex contact in said clamping lever and a rocker arm fixed to said rocker shaft and having a roller adapted to engage said convex contact when said expanding bearing is in locked position around said column whereby said pinion is maintained in disengagement with said power gears.

4. In a radial drilling machine, a vertical column, a radial arm having an expanding bearing around said column and means for clamping said bearing in engagement with said column comprising a draw bolt received through said expanding bearing, a clamping lever pivoted to said draw bolt and having a shoulder integral therewith, a rocker shaft, a rocker arm fixed to said rocker shaft, means for rotating said rocker shaft whereby said rocker arm is adapted to engage said clamping lever thereby engaging said shoulder with said expanding bearing, a segment pinion fixed to said rocker shaft, a screw shaft, a tumbler arm fixed to said screw shaft and having a plurality of gear teeth at one end thereof adapted to mesh with said segment pinion, a gear rotatably mounted on said tumbler arm and fixed to said screw shaft, a tumbler pinion rotatably mounted on said tumbler arm and in mesh with said tumbler gear, power gears adjacent said tumbler pinion and means for maintaining said tumbler pinion in neutral position relative to said power gears when said expanding bearing is clamped around said column.

5. In a radial drilling machine, a vertical column, a radial arm having an expanding bearing around said column and means for clamping said bearing in engagement with said column, a rocker shaft, a segment pinion fixed to said rocker shaft, a screw shaft, a tumbler arm fixed to said screw shaft and having a plurality of gear teeth at one end thereof adapted to mesh with said segment pinion, a gear rotatably mounted on said tumbler arm and fixed to said screw shaft, a tumbler pinion rotatably mounted on said tumbler arm and in mesh with said tumbler gear, power gears adjacent said tumbler pinion and means for maintaining said tumbler pinion in neutral position relative to said power gears when said expanding bearing is clamped around said column.

6. In combination with a radial drilling machine having a vertical column, a radial arm having an expanding bearing in engagement with said column and having a hole therein, a power gear, a screw shaft having threaded connection with said arm, a rocker shaft, a groove in said column, a lug integral with said bearing, a segment gear fixed to the upper end of said rocker shaft, and having a convex side and having gear teeth integral with said segment gear, a tumbler arm having a concave surface at one end thereof adapted to engage said convex surface and having teeth adjacent said concave surface adapted to engage said teeth integral with said segment gear, a screw shaft gear rotatably mounted in said tumbler arm and fixed to said screw shaft, a pinion rotatably mounted on said tumbler arm and in mesh with said screw shaft gear, a draw bolt received in said hole, a clamping lever pivoted to said draw bolt and having a shoulder adapted to engage said lug and having a convex offset and having a cammed end, a rocker arm fixed to said rocker shaft and having a roller adapted to engage said convex offset, a rocker lever fixed to the lower end of said rocker shaft, a latch pivoted to said rocker lever and having a pawl adapted to engage said groove whereby said expanding bearing is adapted to be clamped in engagement with said column and said pinion is adapted to be maintained in neutral position relative to said power gear and when said pawl is disengaged from said groove and said rocker lever is revolved said clamping lever is adapted to release tension of said draw bolt thereby unclamping said expanding bearing from engagement with said column and said concave surface is adapted to disengage said convex surface and said tumbler arm teeth are adapted to mesh with said segment gear teeth whereby said pinion is adapted to mesh with said power gear.

7. In combination with a radial drilling machine, a vertical column, a radial arm having an expanding bearing in engagement with said column, a power gear, a screw shaft having threaded connection with said arm, a rocker shaft, a segment gear fixed to the upper end of said rocker shaft, and having a convex side and having gear teeth integral with said segment gear, a tumbler arm having a concave surface at one end thereof adapted to engage said convex surface, and having teeth adjacent said concave surface adapted to engage said teeth integral with said segment gear, a screw shaft gear rotatably mounted on said tumbler arm and fixed to said screw shaft, a pinion rotatably mounted in said tumbler arm and in mesh with said screw shaft gear, a draw bolt, a clamping lever pivoted to said draw bolt and having a convex offset and having a cammed end, a rocker arm fixed to said rocker shaft adapted to engage said convex offset, and a rocker lever fixed to the lower end of said rocker shaft.

8. In a radial drilling machine having a vertical column, a radial arm having an expanding bearing in engagement therewith, a screw shaft threaded to said arm, power gears adapted to elevate and lower said arm relative to said column, a rocker shaft rotatably mounted in said arm, a rocker arm fixed to said rocker shaft and having a roller rotatably mounted thereon, a draw bolt received by said expanding bearing, a clamping lever pivotally connected to said draw bolt, and having a shoulder adapted to engage said bearing for clamping said arm in engagement with said column and having a contact point adapted to engage said roller for maintaining said bearing in said clamped position, a segment pinion fixed to said rocker shaft having a convex surface and having segment pinion gear teeth adjacent said convex surface, a tumbler arm fixed to said screw shaft and having a concave surface adapted to engage said convex surface and having tumbler gear teeth adjacent said concave surface adapted to mesh with said segment pinion gear teeth, a screw shaft gear rotatably mounted on said tumbler arm and fixed to said screw shaft, a tumbler pinion rotatably mounted in said tumbler arm and in mesh with said screw shaft gear and adjacent said power gears, a manual operative rocker lever fixed to said rocker shaft, a latch pivotally connected to said rocker lever and having a pawl adapted to releasably maintain said expanding bearing in clamped position and simultaneously maintain said tumbler pinion in neutral position relative to said power gears.

9. In a radial drilling machine having a base, a vertical column, a radial arm having an expanding bearing in engagement with said column, a screw shaft threaded to said arm, power transmitting gears adjacent the top of said column, a rocker shaft rotatably mounted adjacent said column, a rocker arm fixed to said rocker shaft and having a roller rotatably mounted thereon, a draw bolt received by said expanding bearing, a clamping lever pivotally connected to said draw bolt and adapted to engage said expanding bearing, a segment pinion fixed to said rocker shaft and having a convex surface and having segment pinion gear teeth adjacent said convex surface, a tumbler arm fixed to said screw shaft and having at one end thereof a concave surface and having tumbler gear teeth adjacent said concave surface adapted to mesh with said segment pinion gear teeth, a tumbler gear rotatably mounted at the other end of said tumbler arm and fixed to said screw shaft, a tumbler pinion rotatably mounted in said tumbler arm, and in mesh with said tumbler gear and adapted to engage said power transmitting gears, a manual operative rocker lever fixed to said rocker shaft, and manual operative means fixed to said rocker shaft adapted to clamp said expanding bearing in engagment with said column and simultaneously disengage said tumbler pinion from said power transmitting gears and means for rotating said rocker shaft for unclamping said expanding bearing prior to engagement of said tumbler pinion with said power transmitting gears, said unclamping of said expanding bearing and said engagement of said tumbler pinion with said power transmitting gear adapted to be accomplished by a single continued movement of said means fixed to said rocker shaft.

10. In a radial drilling machine having a vertical column, a radial arm having an expanding bearing in engagement therewith, a screw shaft having threaded connection with said arm, power transmitting gears adjacent the upper portion of said column, a rocker shaft rotatably mounted in said arm, a cam fixed to said rocker shaft, a draw bolt received by said expanding bearing, a clamping lever pivotally connected to said draw bolt and adapted to be engaged by said cam for producing tension in said bolt for the purpose of clamping said expanding bearing around said column, a segment pinion fixed to said rocker shaft and having a convex surface and having segment pinion gear teeth adjacent said convex surface, a tumbler arm fixed to said screw shaft and having a concave surface adapted to engage said convex surface and having tumbler gear teeth adjacent said concave surface, a tumbler gear rotatably mounted on said tumbler arm and fixed to said screw shaft, a tumbler pinion rotatably mounted in said tumbler arm and in mesh with said tumbler gear and adjacent said power transmitting gear, and manual operative means fixed to said rocker shaft whereby said rocker shaft is adapted to be rotated in one direction from a neutral position thereby unclamping said expanding bearing from said column and by continuous movement in the same direction meshing said segment pinion gear teeth with said tumbler gear teeth thereby rotating said tumbler arm and meshing said tumbler pinion with said power transmitting gears thereby through said threaded connection elevating said arm relative to said column and movement of said manual operative means in an opposite direction from said neutral position adapted to lower said arm relative to said column after unclamping said expanding bearing from around said column.

11. In a radial drilling machine having a vertical column, a radial arm having an expanding bearing in engagement therewith, a screw shaft having threaded connection with said arm, power transmitting gears adjacent said column, a rocker shaft rotatably mounted for the purpose of clamping said expanding bearing around said column, engaging means fixed to said rocker shaft, a tumbler arm fixed to said screw shaft and having a surface adapted to engage said engaging means, a tumbler gear rotatably mounted on said tumbler arm and fixed to said screw shaft, a tumbler pinion rotatably mounted in said tumbler arm and in mesh with said tumbler gear and adjacent said power transmitting gear, and manual operative means fixed to said rocker shaft whereby said rocker shaft is adapted to be rotated in one direction from a neutral position thereby unclamping said expanding bearing from said column and by continuous movement in the same direction meshing said tumbler pinion with said power transmitting gears thereby through said threaded connection elevating said arm relative to said column and movement of said manual operative means in an opposite direction from said neutral position adapted to lower said arm relative to said column after unclamping said expanding bearing from around said column.

HENRY DRESES.
JAMES E. LARSH.